(12) United States Patent
Whittaker

(10) Patent No.: US 7,885,250 B2
(45) Date of Patent: Feb. 8, 2011

(54) METHOD AND APPARATUS FOR SYNCHRONIZATION OVER 802.3AF

(75) Inventor: Tim Whittaker, Cambridge (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 930 days.

(21) Appl. No.: 10/588,432

(22) PCT Filed: Feb. 3, 2005

(86) PCT No.: PCT/IB2005/050454

§ 371 (c)(1),
(2), (4) Date: May 8, 2007

(87) PCT Pub. No.: WO2005/076507

PCT Pub. Date: Aug. 18, 2005

(65) Prior Publication Data

US 2008/0025287 A1    Jan. 31, 2008

Related U.S. Application Data

(60) Provisional application No. 60/542,387, filed on Feb. 5, 2004.

(51) Int. Cl.
*H04J 3/06* (2006.01)
(52) U.S. Cl. ............... 370/350; 455/500; 455/502; 455/561; 455/127.1; 370/338; 370/503; 370/510; 370/514; 370/520; 375/354; 375/356; 375/358; 375/362; 375/364
(58) Field of Classification Search .......... 370/350, 370/338, 401, 503, 505, 507, 508, 509, 510, 370/511, 512, 513, 514, 515, 520; 455/41.2, 455/500, 502, 550.1, 559, 561, 127.1; 375/354, 375/356, 358, 362, 364, 365, 366, 368
See application file for complete search history.

(56) References Cited

U.S. PATENT DOCUMENTS 5,991,885 A * 11/1999 Chang et al. ............ 713/300

(Continued)

FOREIGN PATENT DOCUMENTS

EP    0 560 237    9/1993

(Continued)

OTHER PUBLICATIONS

IEEE Std 802.3af 2003; The Institute of Electrical and Electronics Engineers, Inc.; Jun. 18, 2003; pp. 29-47.*

*Primary Examiner*—Charles N Appiah
*Assistant Examiner*—Olumide T Ajibade-Akonai

(57) ABSTRACT

A method and apparatus for synchronizing timing of Access Points (APs) and/or Synchronization Units (SUs) includes (a) arranging a cable having at least four pairs of twisted wires connected between two or more fixed APs and/or SUs in a network; (b) assigning a first pair of the twisted wires to carry a positive D.C. voltage to at least one AP or SU; (C) assigning a second pair of the twisted wires to carry a negative D.C. voltage to at least one AP or SU; (d) providing to the first and second pairs of rails a series of synchronization pulses generated from a synchronization source and capacitively-coupled to the first and second pairs of twisted wires so as to supply a composite signal; and (e) reconstructing the generated synchronization pulses by detecting pulses on the positive and negative D.C. voltages at a receiving end by at least one AP or SU.

22 Claims, 6 Drawing Sheets

U.S. PATENT DOCUMENTS

| | | | |
|---|---|---|---|
| 6,140,911 A * | 10/2000 | Fisher et al. | 375/258 |
| 6,226,515 B1 * | 5/2001 | Pauli et al. | 455/426.1 |
| 6,535,983 B1 * | 3/2003 | McCormack et al. | 713/310 |
| 7,627,002 B1 * | 12/2009 | Andrade et al. | 370/487 |
| 2002/0187749 A1 | 12/2002 | Beasley et al. | |
| 2004/0042499 A1 * | 3/2004 | Piercy et al. | 370/503 |

FOREIGN PATENT DOCUMENTS

| | | |
|---|---|---|
| WO | 0064099 | 10/2000 |
| WO | 0122659 A2 | 3/2001 |
| WO | 0133744 A1 | 5/2001 |
| WO | 0203626 A3 | 1/2002 |
| WO | WO 02/49275 | 6/2002 |
| WO | 03069855 A1 | 8/2003 |

\* cited by examiner

METHOD AND APPARATUS FOR SYNCHRONIZATION OVER 802.3AF

CROSS REFERENCE TO RELATED APPLICATION

This application claims the benefit of U.S. provisional application Ser. No. 60/542,387 filed Feb. 5, 2004, which is incorporated herein whole by reference.

The present invention relates to portable wireless devices that are capable of communicating with fixed multiple base stations or Access Points using time division multiple access (TDMA), wherein the Access Points are typically wired together in an Ethernet type protocol IEEE 802.3. More particularly, the present invention relates to synchronizing the timing of the multiple Access Points so as to facilitate the handing off of portable wireless devices from one Access Point to another in the TDMA system. The method described is compatible with the power over the Ethernet scheme described in draft standard IEEE P802.3AF and its successors.

802.3AF is a recent addition to IEEE's enormously popular and successful series of 802.3 Ethernet standards. 802.3AF standardizes the Ethernet interface with regards to data transmission and power delivery using the same cable.

Power delivery via Ethernet must be designed so as not to adversely affect data transmission signals, by adding, for example, noise and/or other types of interference. The Ethernet standard under 802.3AF delivers a "low voltage" of 48 VDC to connect Ethernet devices.

The infrastructure for communication typically includes a Basic Service Set (BSS) of an IEEE 802.3 LAN that comprises a server with a plurality of Access Points (AP) that are generally stationary (fixed) and a number of devices (stations or STAs) that can be in wireless communication with at least one AP. The AP connects the stations to the rest of the infrastructure, and permits the stations to communicate with the infrastructure. The stations communicate using a time-division multiple access (TDMA) scheme, which guarantees bandwidth for each connection.

Changing of the location of an STA requires a handing off of its wireless link to one of the neighboring APs. Particularly when the devices are involved in WMTS (Wireless Medical Telemetry Systems) and portable devices that may possibly be attached to a patient to monitor certain vital signs, the disconnection of such devices could have undesirable consequences.

The process of handing-off can be adversely affected by poor timing of the multiple Access Points, meaning that if their timing is not properly synchronized it will be difficult to enable a seamless handover of wireless portable devices from one AP to another.

As shown in FIG. 1, a server 103 is in connection via a local area network 104 using an Ethernet local area networking via Category 5 cables 105,106 with Access Points 107,115. In turn, the Access Points are in wireless contact with a series of mobile stations 105a. Access Point 107 serves area 110, and Access Point 115 serves area 120. Cables 105, 106 carry power and synchronization information as well as data.

In the case where one/some of the devices/stations (STAs) 105a move from a first coverage area 110 under AP 107 to a second coverage area 120 under AP 115, the packets of the STAs 105a are handed-off to the newly associated AP 115 and are referred to as 105b when communicating with this other Access Point 115.

In the particular example shown in FIG. 1, as the STAs 105a move out of range of their associated AP 107, they will be handed-off from the AP 107 and become associated with 115. Unless suitable measures are taken to ensure that the APs are synchronized, the handed-off STAs can suffer from a service disruption and loss of packets during handoff, as the STAs are forced to stop communication immediately and look for other APs with which to associate.

The portable STAs periodically perform a site survey, which provides an overall picture of the neighborhood information, and includes a list of neighboring APs, with the neighboring APs on the list being the ones with which the STA will try to associate should a handoff be required. Handoffs are under control of each STA, which makes its own independent judgment of the quality of signal that it receives, and whether a stronger (and therefore better) signal is available from another AP. To perform a handoff, the STA connects to the new AP in a different time-slot of the TDMA scheme, establishes communication, then releases the connection to the old AP, thereby performing a seamless transition from one AP to the next.

However, if the timing of APs is not synchronized, there is increased likelihood that a loss of connection could result. As a result, for example, in WMTS, when a patient is being transported from one wing of the hospital to another, their vital signs will no longer be monitored if the connection with a receiving station is lost.

Thus, there is a need in the art for a timing synchronization system that does not require additional complex circuitry or add large costs to the system.

The presently claimed invention provides accurate timing synchronization for a time-division multiplexed (TDMA) system using the existing cables of a LAN, particularly when used with the power cable arrangement in the IEEE 802.3AF standard.

The presently claimed invention provides a method of synchronization for multiple Access Points under 802.3 so that a handoff of a portable wireless device from one Access Point to another can occur seamlessly. The method includes assignment of a specific number of pairs of a Category 5 (hereinafter "Cat 5") cable, so that a predetermined number of pairs are used to distribute power and synchronization information while the other two pairs are used to distribute data.

The present invention also provides a Wireless Medical Telemetry System (WMTS) Synchronization Unit (SU). The SU typically includes a block of RJ-45 connectors, with a first predetermined number of connectors that can be connected to a plurality of outputs of an Ethernet switch or hub, via a 'power over Ethernet unit' (which may be included in the switch or hub) conformant with the IEEE P802.3AF standard. A second predetermined number of connectors may be connected to a plurality of AP's and/or slave SUs, delivering Ethernet data, power and synchronization signals via the Cat 5 cable. In a network of SUs and APs, one SU will be designated the master WMTS Synchronization Unit, and will connect to a suitable 'master input' socket in each of a plurality of slave SUs. The slave SUs will in turn feed APs or further slave SUs.

The WMTS SU may include a socket intended for an external frequency standard, including but not limited to, a 10 MHz reference standard. Hence, a given SU can either freely run, or be a slave to an external frequency standard, or may be slaved to a remote "Master".

One advantage of the presently claimed invention is that if a Wireless Medical Telemetry System (WMTS) synchronization fails, power can still be provided to the APs through its circuit. In addition, the individual slave SUs can continue a free-run, synchronizing the islands of APs.

It is to be understood by persons of ordinary skill in the art that the following descriptions are provided for purposes of illustration and not for limitation. An artisan understands that there are many variations that lie within the spirit of the invention and the scope of the appended claims. Unnecessary detail of known functions and operations may be omitted from the current description so as not to obscure the finer points of the present invention.

The basic steps of a method according to the present invention can include the following:

(a) arranging a cable comprising at least four pairs of twisted wires connected between an Ethernet LAN and each fixed Access Point (AP) and/or a nearby Synchronization Unit (SU) in a network, and between master and slave SUs;

(b) assigning a first pair of the four pairs of twisted wire to carry a positive D.C. rail voltage to at least one AP or SU;

(c) assigning a second pair of the four pairs of twisted wire to carry a negative D.C. rail voltage to the AP or SU;

(d) providing to at least one of the first and second pairs of rails a series of synchronization pulses generated from a synchronization source and capacitively-coupled to a first end of the first and second pairs of twisted wire so as to supply a composite signal; and (e) reconstructing the generated synchronization pulses by detecting pulses on the positive and negative D.C. voltage rails at a second end by said at least one AP or SU.

While the following descriptions elaborate the steps recited above, it is to be stressed that the claimed invention is not limited to the details that have been provided in this application merely for illustrative purposes.

Figure 1:
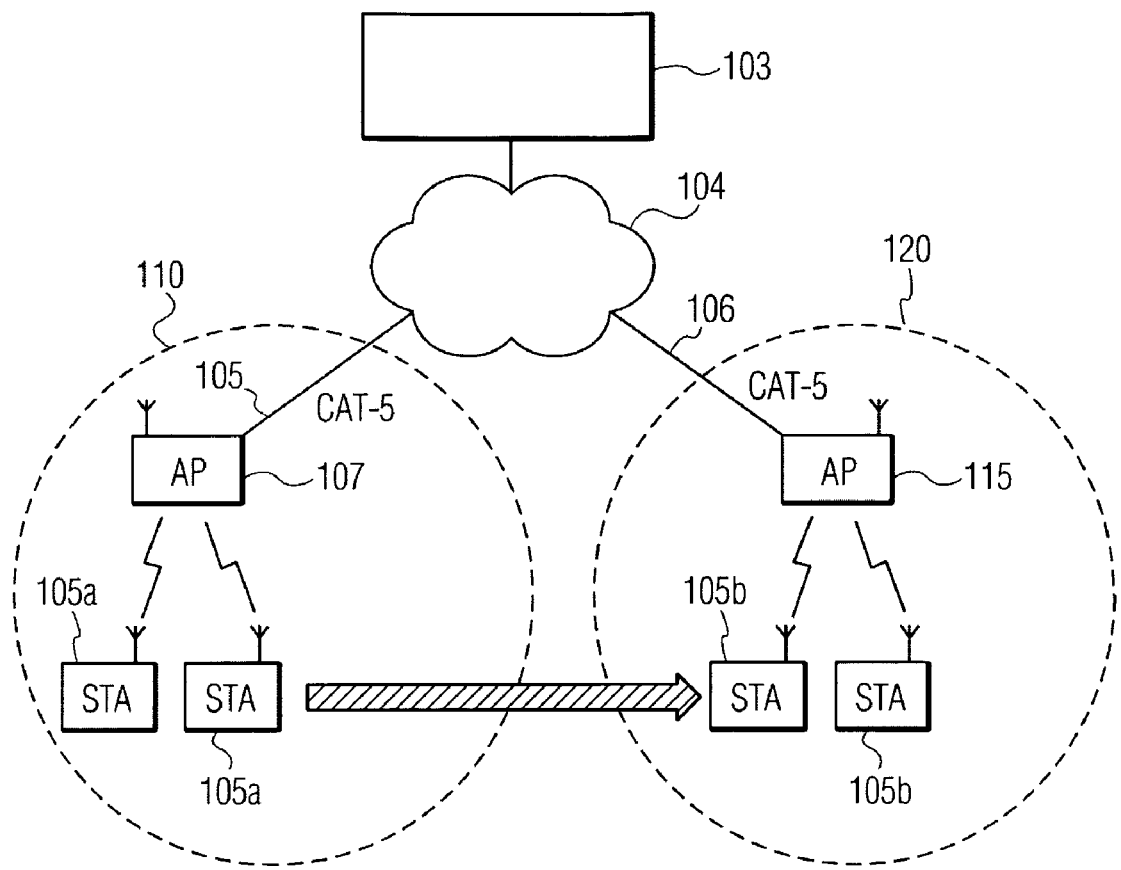
FIG. 1 illustrates a system having two or more Access Points and a plurality of stations/device in communication, with a specific Access Point.
Figure 2:
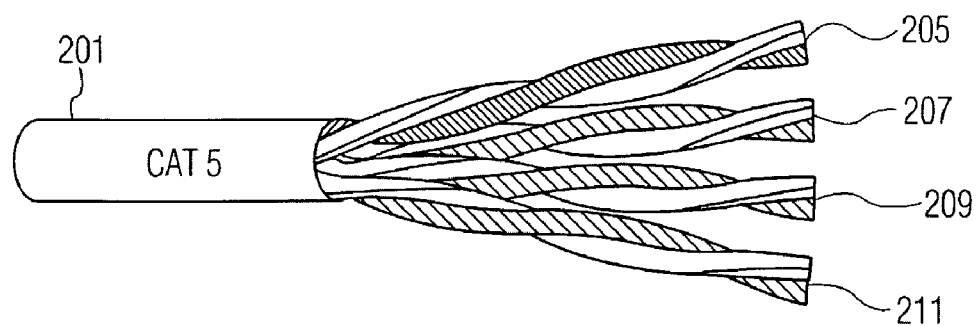
FIG. 2 illustrates a Category 5 cable having four twisted pair of wires.

FIG. 2 illustrates a Category 5 cable 201 (or "Cat-5"), which is a particular type of network cabling that comprises four twisted pair of copper wires 205, 207, 209, 211, normally color coded (each pair having one wire with a solid color such as orange, brown, green or blue). Cat-5 cables are capable of supporting frequencies up to 100 MHz and speeds of 1000 Mbps, and are typically used for ATM, token ring, 1000 Base-T, 100 Base-T and 10 Base-T networking. It should be understood that while Cat-5 cables are used here, any multiple twisted pair cable having at least four pairs of twisted wires and able to handle minimum frequency requirement can be used to connect multiple stationary Access Points between each other.

Figure 3:
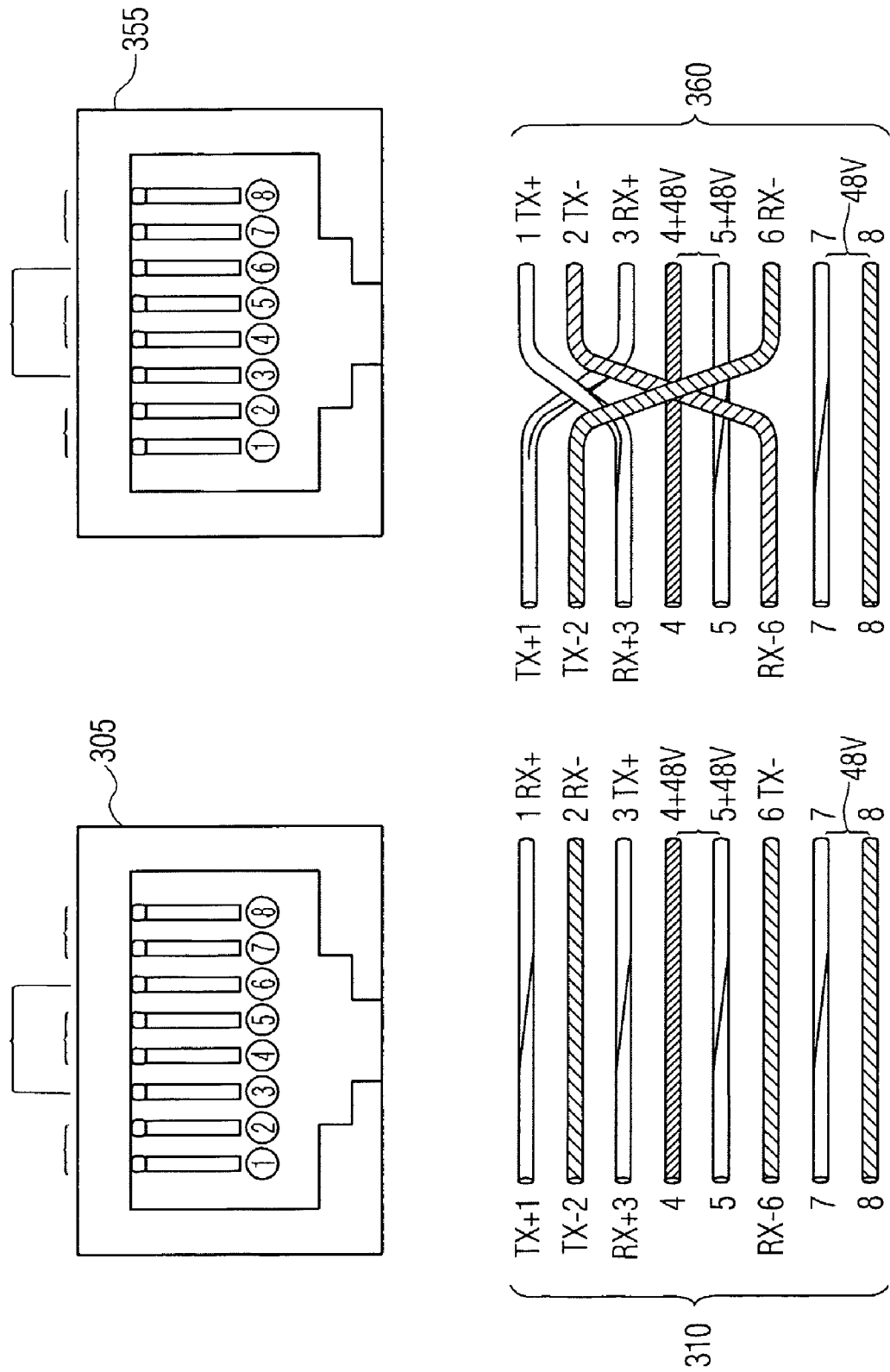
FIG. 3 illustrates two types of RJ-45 connectors, and provides a wire schematic according to the present invention.

In this application the RJ-45 connectors are wired for "straight through" connections as shown by connector 305 and wiring diagram 310 in FIG. 3. However, it is possible that a crossover configuration, as shown by wiring diagram 360, results in the wiring of connector 355.

It had been the custom that pins 4, 5, 7, 8 of the RJ-45 were unused. However, the IEEE 802.3AF standard adopted the use of pins 4 and 5 being connected together and carrying the positive rail of the 48V power supply, and pins 7 and 8 being connected together and carrying the negative rail of the 48V power supply. According to the present invention, power and synchronization information are sent over the same conductors within the network wiring. The 48 Volts is supplied by a power hub (which can either be separate or be included within an Ethernet hub or switch) which complies with the IEEE 802.3AF standard.

According to the present invention, the synchronization pulses are capacitively coupled to the power rails, which are isolated from the Power Hub by small inductors. Due to this coupling scheme, synchronization pulses are sent as alternative positive and negative differentiated pulses: the pulse receiver detects these pulses on the positive and negative rails of the 48V supply and uses voltage compactors and a D-type flip-flop to reconstruct the synchronization signal.

The synchronization pulses do not interfere with the correct operation of the voltage rails, particularly when it operates the IEEE 802.3AF scheme to detect the presence of a correct load on the end of the relevant cables prior to applying power. A power detection circuit on each input from the Power Hub ensures that the synchronization pulses are only sent after at least 36 volts is detected for at least 200 ms, in order to prevent disturbance of the P802.3AF detection system.

Figure 4A:
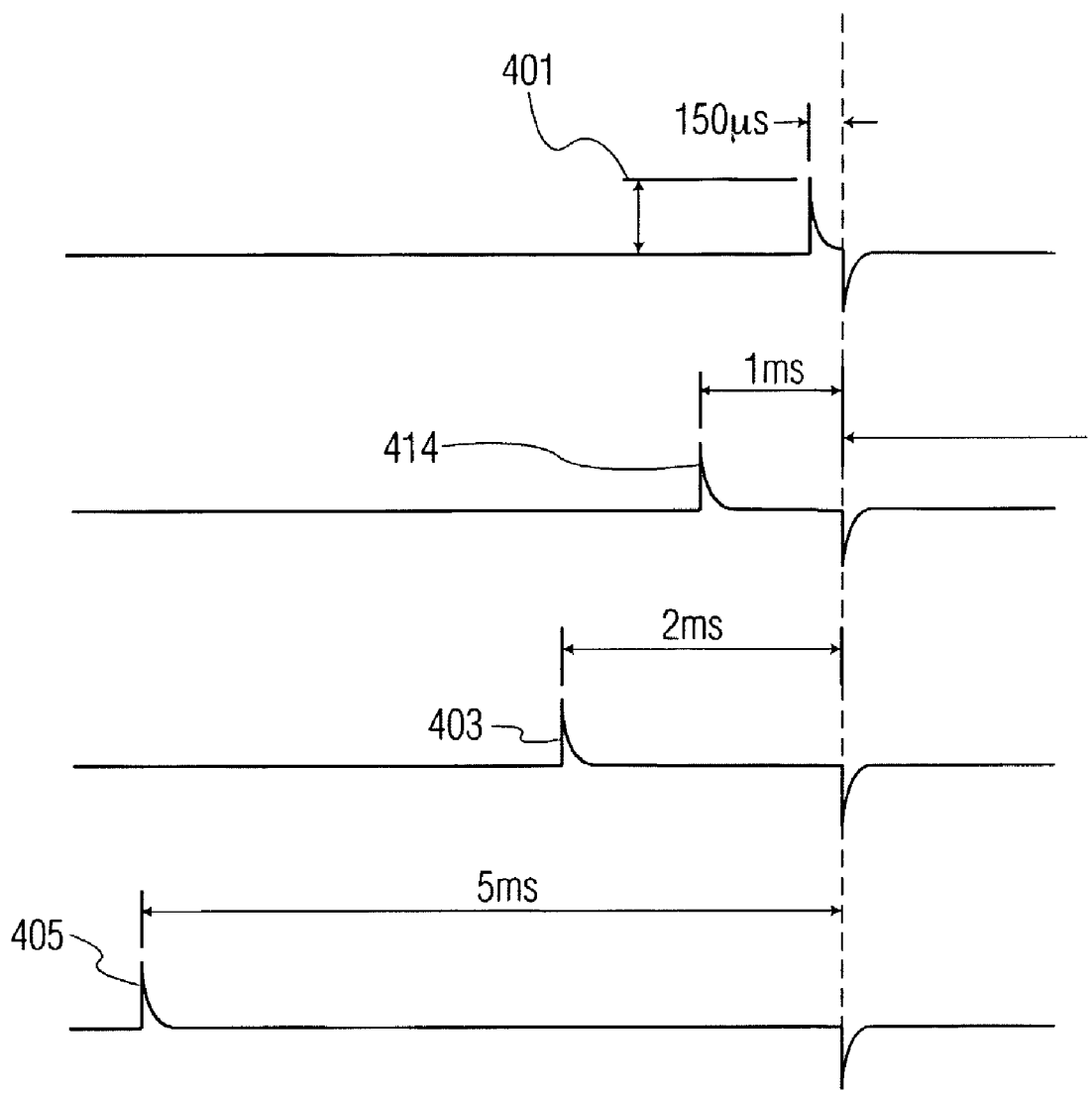
FIG. 4A illustrates a diagrammatic view of the synchronization pulses at the AP/SU according to the present invention.

FIG. 4A illustrates a diagrammatic view of the synchronization pulses at the AP/SU. In normal operation, and as shown in FIG. 4A, three pulse widths can be generated wherein:

(1) standard frame pulses 401 typically have a high duration of 150 us+/−50 us;

(2) multiframe pulses 403 that are not PSCN (Primary receiver Scan Carrier Number) synchronization pulses have a high duration of 2 ms+/−50 us;

(3) multiframe pulses 405 that are PSCN synchronization pulses have a high duration of 5 ms+/−50 us.

The synchronization signals can be sent pseudo-differentially, in a positive sense on pins 4, 5 (together), and in a negative sense on pins 7, 8. The pulse amplitude is 2V+/−10% with a rise-time of 100 ns+/−25 as when the output is connected to a Master SU input or the input of an AP.

This circuit is galvanically isolated from the rest of the WMTS synchronization unit in accordance with the standard IEEE 802.3 section 14.3.1.1., to at least 2M ohm DC resistance and with a dielectric strength of 2.4 kV. This isolation is also provided between interfaces, to ensure that no assumptions are made about the Power Hub itself (e.g. which line it switches, which rails it regards as common for sensing, etc.).

The synchronization pulses may be modified to suit different frame lengths and numbers of carriers in a WMTS or other communication system.

Alarm pulses (414 in FIG. 4A, 444 in FIG. 4B) can be sent if there is a problem with the synchronization pulses downstream.

Figure 5:
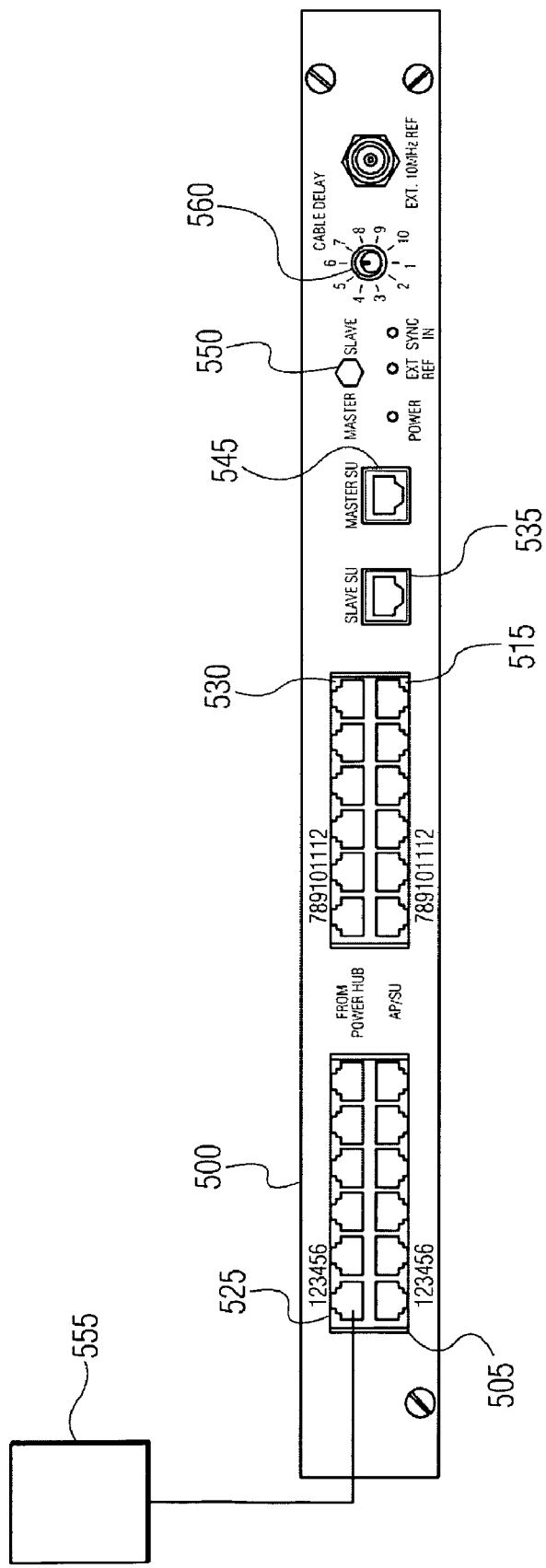
FIG. 5 illustrates a layout of a portion of a WMTS Synchronization Unit (SU) according to the present invention.

FIG. 5 illustrates a layout of a portion of a WMTS Synchronization Unit (SU) according to the present invention. It is to be understood by persons of ordinary skill in the art that the illustrations presented herein are for purposes of illustration and not for limitation. If an artisan changes the shape, number of rows, positions, arrangement of the item, or details of the circuitry it still clearly falls within the spirit of the invention and the scope of appended claims.

First, it should be noted that the WMTS SU 500 does not require a microprocessor or software, as it preferably comprises a field-programmable gate array (FPGA) to accommodate at a low cost the divider chain and pulse generation and the ability to detect some fault conditions. The functional blocks that comprises the FPGA include input conditioning module 632, divider chain and delay compensation module 634, reference input select 637, LED driver 639 and frequency locked loop 645.

In this particular illustration, there are two blocks of RJ-45 connectors 505, 515 on the front panel (please note, it could also be a rear panel, side panel, etc.). The bottom 12 RJ-45 sockets (AP/SU 1 to 12) can be connected to APs and/or slave SUs. The signals emanating from these RJ-45 connectors are Ethernet, and when connected to an AP, or the 'Master SU' input of another SU, 48 volts plus synchronization signal. The upper 12 sockets 525,530 connect to a power hub (or Ethernet switch or hub including the IEEE 802.3AF powering scheme) 555 which delivers power over the LAN according to the IEEE 802.AF scheme. An isolation barrier is provided between each of the twelve pairs of Ethernet sockets and the rest of the WMTS SU.

The SU also includes a further synchronization output 535, called a 'Slave SU' (this output is not applicable to an AP), designed to feed a slave SU only with WMTS synchronization pulses. This connects to the 'Master SU' socket 545 of the slave SU. A switch 550 sets the WMTS SU into one of master or slave mode. A adjustment unit 560 is included, which may comprise a switch or an equivalent function to adjust the compensation delay for the length of the Cat 5 cable between a remote master WMTS SU and the 'Master SU' input of the slave WMTS SU.

The WMTS SU can either freely run, or be a slave to an external 10 MHz source, or be a slave to a remote master. If the 10 MHz source and the remote Master SU source are both available, the selection is made automatically and the output of the SU is slaved to the latter. It is preferable but not required that the Master SU at the head of a chain in a large installation should be fed from an external 10 MHz frequency standard, and that other SUs should operate in slave mode using the synchronization pulses from the Master SU.

Figure 6:
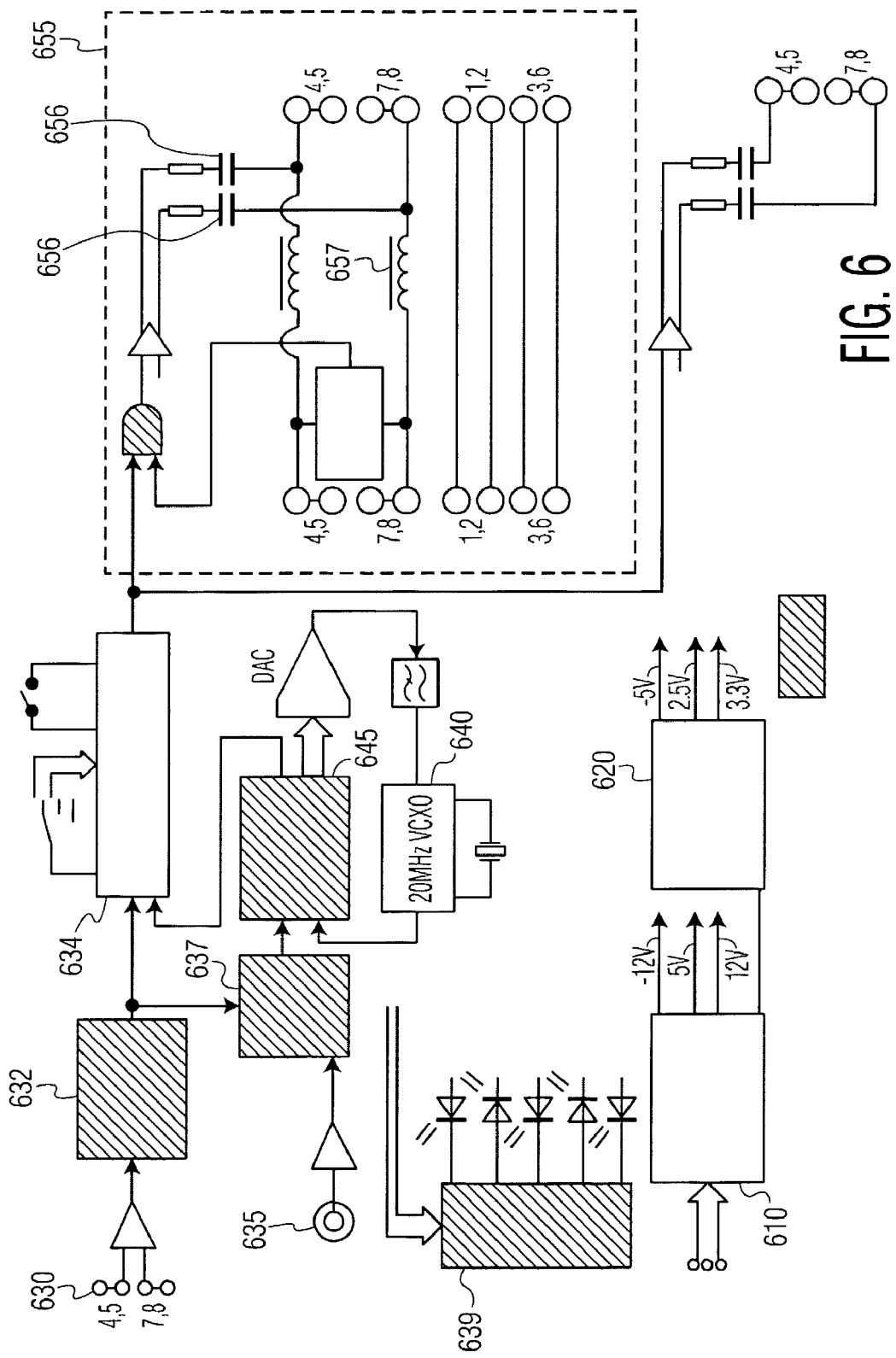
FIG. 6 illustrates a block diagram of a WMTS Synchronization Unit (SU) according to the present invention.

As shown in FIG. 6, a power supply module 610 provides +5V, +12V and −12V rails. Linear sub-regulators 620 on the WMTS Synchronization Board provide +3.3V and +2.5V for the FPGA and other digital circuitry. The input power (line receiver 630) from the Master SU 545 comprises the +48V and the −48 Volts by pins 4, 5 and 7, 8, respectively. The external 10 MHz input signal receiving unit 635 is preferably a BNC or other coaxial connection. The time base VCXO 640 in this particular case uses a 20 MHz+/−15 ppm temperature-compensated voltage-controlled crystal oscillator, but persons of ordinary skill in the art may substitute according to need and cost. The VCXO supplies a 20 MHz frequency locked-loop to minimize the disruptive effect of a break in the chain of the WMTS SUs, presuming there are several units chained together.

As shown in box 655 (the synchronization pulse injection unit), power and synchronization pulse information is sent over the same conductors within the network wiring. As the pins 4, 5 and 7, 8 (or the RJ-45 connectors) are connected together to a respective +48v rail and −48V rail are capacitively coupled via capacitors 656 to the power rails (high frequency pulses encounter little impedance from the capacitors), which in turn are isolated from the power hub by small inductors (as high frequency pulses encounter high impedance with the inductors).

Figure 4B:
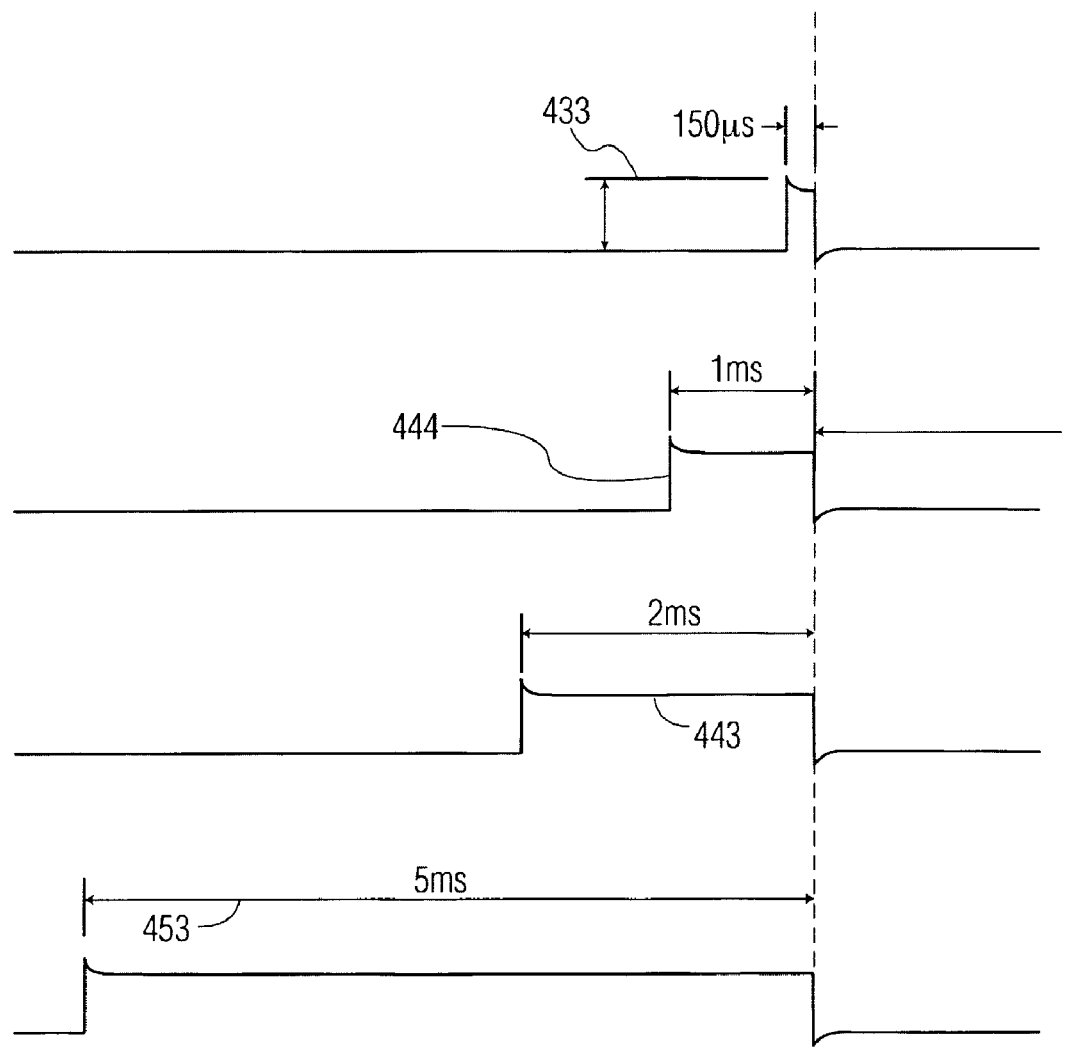
FIG. 4B illustrates a diagrammatic view of the synchronization pulses at the slave SU output.

Various modifications can be made to the present invention without departing from the spirit of the invention or the scope of the appended claims. For example, while cables such as Category 5 twisted wire and connectors such as RJ-45s are preferred, neither is a requirement to practice the claimed invention. The wires could be straight, or the category of cable could be different. The 48 volts rail voltage happens to be a standard, but the standard and/or the voltage could be changed according to need so that it could be any amount. The number of wire pairs in the cable can be greater or less than four, and while the RJ-45 connector is preferred, equivalent or successors of the RJ-45 connector that serves a similar purpose could be used. The external timing source can be a frequency less than or greater than 10 MHz, and depending on need could range anywhere from fractions to multiples of this 10 MHz value. Nor does the connection require a BNC connector. Functionally equivalent circuitry could be used in lieu of the items shown in FIGS. 5 and 6. Also, the voltage value and frequency of the synchronization pulses shown in FIGS. 4a and 4B are provided for illustrative purposes and can be longer or shorter in length and/or repetition frequency, and lower or higher in voltage.

What is claimed is:

1. A method for synchronizing a timing of multiple fixed wireless Access Points and/or Synchronization Units in a network communicating under an Ethernet-related protocol, comprising the steps of:
    (a) arranging a cable comprising at least four pairs of twisted wires connected between an Ethernet LAN and a plurality of fixed Access Points (AP) and/or Synchronization Units (SU) in a network;
    (b) assigning a first pair of the at least four pairs of twisted wire to carry a positive D.C. rail voltage to at least one (AP) or (SU), and assigning a second pair of the least four pairs of twisted wire to carry a negative D.C. rail voltage to said at least one (AP) or (SU);
    (c) providing to at least one pair of the first and second pairs of twisted wires a series of synchronization pulses generated from a synchronization source and capacitively-coupled to the said at least one pair of twisted wires so as to supply a composite signal that includes the series of synchronization pulses and at least one of the positive and negative D.C. voltage rails to a first end of said at least one pair of twisted wires; and
    (d) reconstructing the generated synchronization pulses by detecting pulses on the positive and negative D.C. voltage rails at a second end of said at least one pair of twisted wires by said at least one (AP) or (SU).

2. The method according to claim 1, wherein each wire of the respective first and second pairs are connected together by one of a connector and a physical connection of the respective pair.

3. The method according to claim 2, further comprising connecting the cable to the (AP) or (SU) via an RJ-45 connector.

4. The method according to claim 1, wherein the LAN powering scheme comprises that described in one of draft standard IEEE P802.3AF.

5. The method according to claim 1 operating in a TDMA system, wherein each (AP) communicates with multiple portable wireless devices, and in which portable wireless devices can associate with multiple (APs) in sequence, handing off between them.

6. The method according to claim 5, wherein said each (AP) communicates with multiple portable devices in a WMTS (Wireless Medical Telemetry System).

7. The method according to claim 1, wherein the positive D.C. rail voltage is applied to pins 4 and 5 of the RJ-45 connector.

8. The method according to claim 1, wherein the negative D.C. rail voltage is applied to pins 7 and 8 of the RJ-45 connector.

9. The method according to claim 1, further comprising that a third pair of the least four pairs of twisted wire carries data to the (APs).

10. The method according to claim 9, further comprising that a fourth pair of the at least four pairs of twisted wire carries data from the (APs).

11. The method according to claim 1, wherein the network includes more than one synchronization unit (SU), and wherein the synchronization source comprises a master (SU) that designates additional (SUs) in the network as slave (SUs) that receive the synchronization pulses from the master (SU).

12. A Wireless Medical Telemetry System (WMTS) synchronizing unit for synchronizing the timing of multiple Access Points of a WLAN, comprising:
a receiving unit for receiving an external timing signal;
a line receiver having input sockets being adapted for receiving a cable comprising at least four pairs of wires from a master synchronizing unit when the WMTS synchronizing unit has been designated as a slave unit, wherein two pairs of said at least four pairs of wire contain synchronization pulses from the master synchronizing unit;
a power module adapted for receiving a rail voltage from a power hub and for providing predetermined voltage level outputs;
a synchronization source unit for generating synchronization pulses when the WMTS synchronizing unit has been a master synchronizing unit; and
a plurality of synchronization pulse injection units for sending synchronization pulses and a rail voltage over a common two pairs of wires, wherein the synchronization pulses are capacitively coupled to the rail voltage on the common two pairs of wires.

13. The apparatus according to claim 12, wherein the sockets are adapted to receive RJ-45 connectors connected to Category 5 twisted wire cable.

14. The apparatus according to claim 12, wherein a field programmable gated array (FPGA), LED driver and a frequency locked loop control functionality in lieu of a processor or microprocessor.

15. The apparatus according to claim 12, further comprising a block of output connectors adapted for providing an output of data and synchronization pulses to one or more slave synchronization units.

16. The apparatus according to claim 15, wherein the output synchronization pulses comprises at least one of standard frame pulses, multiframe pulses that are not PSCN (Primary receiver Scan Carrier Number) synchronization pulses, and multiframe pulses that comprise PSCN synchronization pulses.

17. The apparatus according to claim 12, further comprising a block of output connectors adapted for providing an output of data, a combination of the rail voltage and capacitively coupled synchronization pulses to a plurality of Access Points.

18. The apparatus according to claim 17, wherein the rail voltage continues to be output to the Access Points via the connectors after a failure of synchronization pulses occurs.

19. The apparatus according to claim 17, wherein the synchronization pulses are output only after a predetermined rail voltage has been detected.

20. The apparatus according to claim 12, further comprising a master/slave selection switch.

21. The apparatus according to claim 12, further comprising a cable delay adjustment unit for compensating a length of cables used.

22. The apparatus according to claim 12, wherein the synchronization pulse injection units includes capacitive elements to couple the synchronization pulses to power cables 4,5, 7,8 that connected to the power rails.

* * * * *